(12) United States Patent
Liao

(10) Patent No.: US 8,109,645 B2
(45) Date of Patent: Feb. 7, 2012

(54) ILLUMINATION DEVICES HAVING MOVABLE FLUID-DRIVEN GENERATOR

(75) Inventor: Jung-Huang Liao, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 598 days.

(21) Appl. No.: 12/269,727

(22) Filed: Nov. 12, 2008

(65) Prior Publication Data
US 2010/0002423 A1    Jan. 7, 2010

(30) Foreign Application Priority Data
Jul. 2, 2008    (TW) ................................ 97124853 A (51) Int. Cl.
*F21L 13/02*    (2006.01)
(52) U.S. Cl. ........... 362/192; 362/96; 362/193; 362/109
(58) Field of Classification Search .............. 362/96, 362/109, 192, 193, 249.02, 545
See application file for complete search history.

(56) References Cited

U.S. PATENT DOCUMENTS

| 3,845,291 | A  | * | 10/1974 | Portyrata | 362/192 |
|---|---|---|---|---|---|
| 4,616,298 | A  | * | 10/1986 | Bolson | 362/192 |
| 4,731,545 | A  | * | 3/1988 | Lerner et al. | 290/54 |
| 4,963,780 | A  | * | 10/1990 | Hochstrasser | 310/104 |
| 6,036,333 | A  | * | 3/2000 | Spiller | 362/192 |
| 6,116,520 | A  |   | 9/2000 | Lee | |
| 7,067,936 | B2 | * | 6/2006 | Baarman et al. | 290/43 |
| 7,121,495 | B2 | * | 10/2006 | Caamano | 242/390.5 |
| 7,571,867 | B2 | * | 8/2009 | Hu | 239/383 |
| 7,607,789 | B2 | * | 10/2009 | Lu et al. | 362/96 |
| 7,608,936 | B2 | * | 10/2009 | Shimizu et al. | 290/43 |
| 7,841,732 | B2 | * | 11/2010 | Coushaine et al. | 362/96 |
| 2003/0147238 | A1 | * | 8/2003 | Allen et al. | 362/192 |
| 2007/0126237 | A1 |   | 6/2007 | Liao et al. | |
| 2008/0022920 | A1 |   | 1/2008 | Custodis | |

FOREIGN PATENT DOCUMENTS

| JP | 52-116693 | 9/1977 |
|---|---|---|
| JP | 61-076173 | 4/1986 |
| JP | 4-60251 U | 5/1992 |
| JP | 8-229154 A | 9/1996 |
| JP | 2005278902 | 10/2005 |
| KR | 100308732 | 1/2002 |
| TW | I269850 | 1/2007 |

OTHER PUBLICATIONS

Taiwan Patent Office, Office Action—Notice of Allowance, U.S. Appl. No. 097124853, Mar. 25, 2011, Taiwan.
China Patent Office, Office Action, Application Serial No. 200810129880.7, Dec. 6, 2010.
Japan Patent Office, Notice of Allowance, Patent Application Serial No. 2008-327020, Apr. 13, 2011, Japan.

* cited by examiner

*Primary Examiner* — Ismael Negron (57) ABSTRACT

An illumination device includes a nozzle, a grip, at least one light element connected to the nozzle, and a moveable turbine generator electrically connected to the light-emitting element. The turbine generator includes at least one rotatable blade. When the turbine generator is moved into the nozzle, the impact of a fluid flowing through the nozzle causes the rotatable blade to rotate, thereby generating electric power to power the light-emitting element. When the turbine generator is moved into the grip, the rotatable blade is not subjected to the impact of the fluid flowing through the nozzle, stopping the turbine generator from generating the electric power.

13 Claims, 9 Drawing Sheets

ILLUMINATION DEVICES HAVING MOVABLE FLUID-DRIVEN GENERATOR

CROSS REFERENCE TO RELATED APPLICATIONS

This application claims priority of Taiwan Patent Application No. 097124853, filed on Jul. 2, 2008, the entirety of which is incorporated by reference herein.

BACKGROUND OF THE INVENTION

1. Field of the Invention

The invention relates to adjustable fluid-driven illumination devices, and more particularly to adjustable fluid-driven illumination devices with enhanced operational flexibility and efficiency.

2. Description of the Related Art

Water supply and illumination are two critical safety factors during fire suppression at a fire scene. Conventionally, in addition to holding a fire-fighting nozzle to acquire water, a firefighter utilizes a flashlight disposed on a helmet to illuminate the fire scene. Accordingly, as fire-suppression equipment carried by the firefighter often weigh more than 20 Kg, the heavy flashlight disposed on the helmet causes an extra burden to the firefighter, thus adversely affecting the fire suppression. In another aspect, because a fire-fighting hose provides a powerful water pressure, the firefighter must securely hold the fire-fighting nozzle with two hands during the fire suppression. Therefore, the firefighter cannot spare extra strength or a hand to hold the flashlight for illumination of the fire scene.

To solve the aforementioned problems, Taiwan patent. No. 1269850 discloses a conventional fluid-driven illumination device with a turbine generator inlaid in a fluid passage of a fire-fighting nozzle. Vanes of the turbine generator are driven to rotate by water flowing through the fluid passage of the fire-fighting nozzle, generating electric power to provide illumination. The turbine generator inlaid in the fluid passage of the fire-fighting nozzle, however, causes loss of water pressure and amount whenever the fire-fighting nozzle is operated. Thus, employment of the conventional fluid-driven illumination device or fire-fighting nozzle for complex and unpredictable fire scenes is limited.

Moreover, Japan patent Pub. No. 2005278902, U.S. Pat. No. 6,036,333, U.S. Pat. No. 6,116,520, and Korea patent No. 100308732 disclose various conventional fluid-driven illumination devices. Similarly, because of structural constraints and limitations for complex and unpredictable fire scene employment, use of the fluid-driven illumination devices is limited.

BRIEF SUMMARY OF THE INVENTION

A detailed description is given in the following embodiments with reference to the accompanying drawings.

An exemplary embodiment of the invention provides an adjustable fluid-driven illumination device comprising a nozzle, at least one light-emitting element, a grip, and a turbine generator. The light-emitting element is connected to the nozzle. The grip is connected to the nozzle. The turbine generator moves between the nozzle and the grip and is electrically connected to the light-emitting element. The turbine generator comprises at least one rotating blade. When moving into the nozzle to enable the rotating blade to rotate by impact of a fluid flowing through the nozzle, the turbine generator generates electric power, driving the light-emitting element to irradiate. When the turbine generator moves into the grip, the rotating blade is not subjected to the impact of the fluid flowing through the nozzle, stopping the turbine generator from generating the electric power.

The adjustable fluid-driven illumination device further comprises a revolver rotatably and movably connected to the grip and abutting the turbine generator, driving the turbine generator to move between the nozzle and the grip.

The grip comprises an inner threaded portion. The revolver comprises an outer threaded portion engaging the inner threaded portion.

The adjustable fluid-driven illumination device further comprises a push rod abutting the revolver and connected to the turbine generator.

The adjustable fluid-driven illumination device further comprises at least one resilient element connected between the turbine generator and the grip, providing restoring resilience to the turbine generator.

The adjustable fluid-driven illumination device further comprises a trigger rotatably connected to the grip and connected to the turbine generator, driving the turbine generator to move between the nozzle and the grip.

The adjustable fluid-driven illumination device further comprises a torsion spring connected between the trigger and the grip, providing restoring resilience to the trigger.

The adjustable fluid-driven illumination device further comprises a support rod, a fixed tube, a self-rotation shaft, a spring, and a button. The grip comprises a partition on which the turbine generator is disposed. The support rod is fit in the partition and is connected to the turbine generator. The fixed tube is disposed under the partition. The self-rotation shaft is movably disposed in the fixed tube and abuts the support rod. The spring is fit on the support rod and is connected between the partition and the self-rotation shaft. The button is connected to the self-rotation shaft, driving the turbine generator to move between the nozzle and the grip.

The rotating blade comprises a radial blade.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

First Embodiment

Figure 1A:
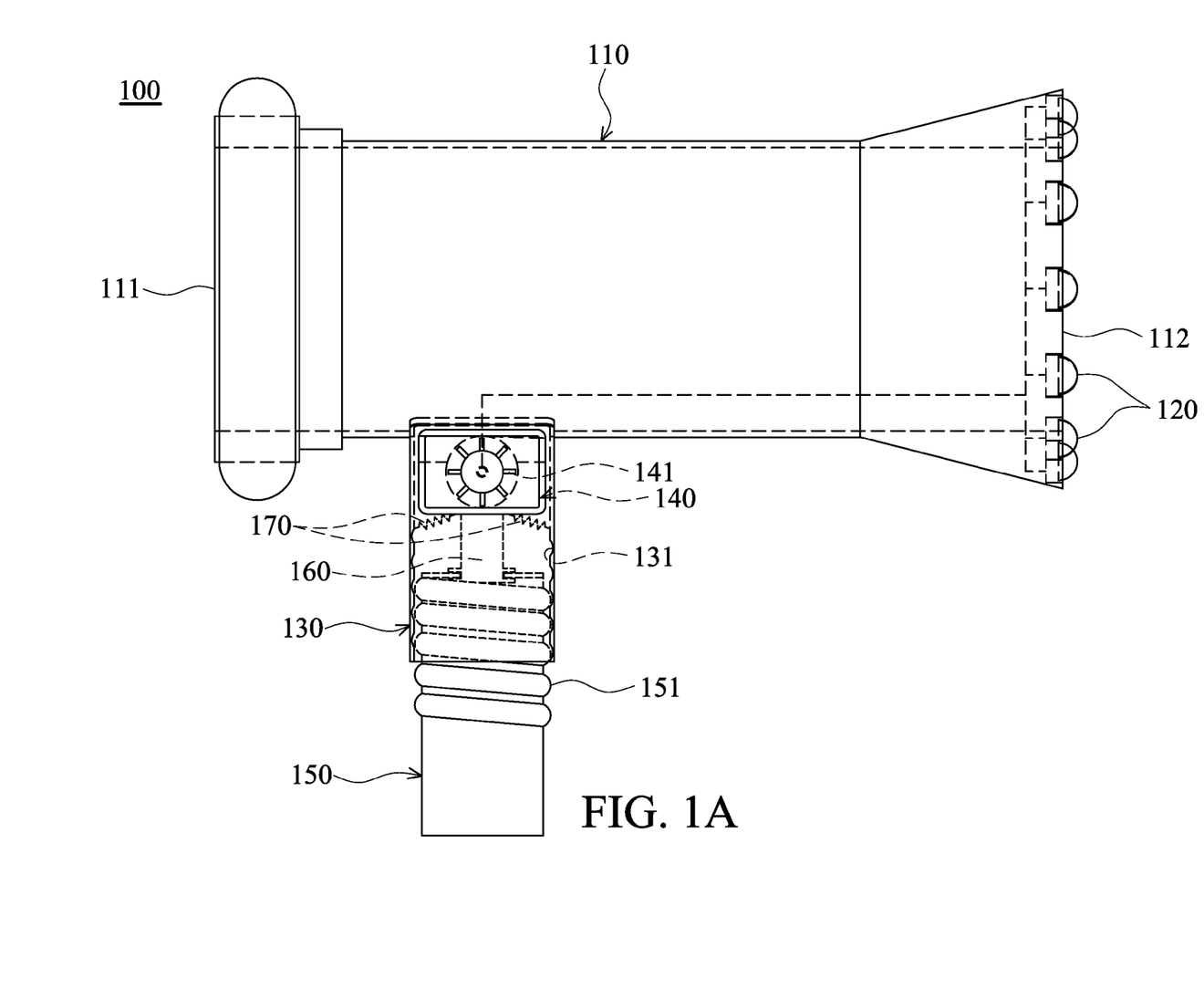
FIG. 1A is a schematic plane view of an adjustable fluid-driven illumination device of a first embodiment of the invention in an operational mode.
Figure 1B:
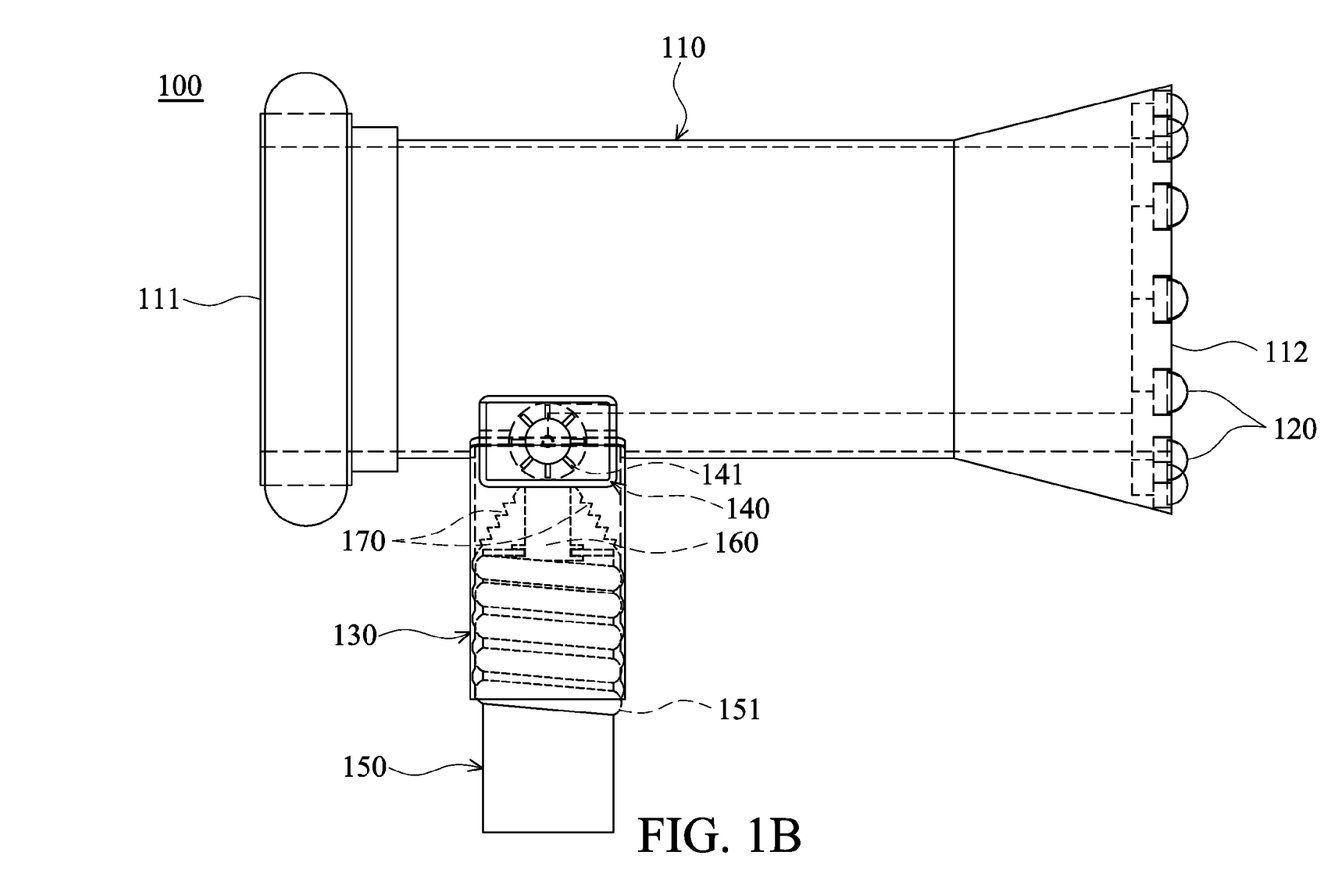
FIG. 1B is a schematic plane view of the adjustable fluid-driven illumination device of the first embodiment of the invention in another operational mode.

Referring to FIG. 1A and FIG. 1B, an adjustable fluid-driven illumination device 100 is applied for fire suppression and comprises a nozzle 110, a plurality of light-emitting elements 120, a grip 130, a turbine generator 140, a revolver 150, a push rod 160, and a plurality of resilient elements 170.

One end 111 of the nozzle 110 may connect to a fluid supply piping (not shown). In this embodiment, the nozzle 110 may serve as a fire-fighting nozzle.

The light-emitting elements 120 are connected to the nozzle 110. Specifically, the light-emitting elements 120 may be disposed on the other end 112 of the nozzle 110. Moreover, the light-emitting elements 120 may be high-brightness LEDs or light bulbs.

The grip 130 is connected to the nozzle 110. In this embodiment, the grip 130 is disposed between the end 111 and end 112 of the nozzle 110. Additionally, the grip 130 comprises an inner threaded portion 131.

The turbine generator 140 is electrically connected to the light-emitting elements 120 and comprises a plurality of rotating blades 141. In this embodiment, the rotating blades 141 may be radial blades, impulse blades, or axial blades.

The revolver 150 is rotatably and movably connected to the grip 130 and abuts the turbine generator 140 by way of the push rod 160. Namely, the push rod 160 abuts the revolver 150 and is connected to the turbine generator 140. Additionally, the revolver 150 comprises an outer threaded portion 151 engaging the inner threaded portion 131 of the grip 130. Accordingly, by rotation of the revolver 150, the revolver 150 can move (upward and downward) in the grip 130, driving the turbine generator 140 to move between the nozzle 110 and the grip 130.

The resilient elements 170 are respectively connected between the turbine generator 140 and an inner wall of the grip 130. In this embodiment, the resilient elements 170 are springs.

The following description is directed to operation of fire suppression using the adjustable fluid-driven illumination device 100.

An operator or a firefighter can hold the nozzle 110 and aim a fluid outlet (i.e. the end 112) thereof at a fire source or fire scene. A fluid, such as water, flowing through the nozzle 110 can then be spouted to the fire source or fire scene.

When the fire scene is dark and requires illumination, the operator can rotate the revolver 150 with one hand, enabling the revolver 150 to move (upward) in the grip 130, and further driving the turbine generator 140 to move (upward) into the nozzle 110, as shown in FIG. 1B. At this point, the rotating blades 141 of the turbine generator 140 are rotated by impact of the fluid (water) flowing through the interior of the nozzle 110, driving the turbine generator 140 to generate electric power. The electric power generated by the turbine generator 140 is transmitted to the light-emitting elements 120 disposed on the fluid outlet (end 112) of the nozzle 110, driving the light-emitting elements 120 to irradiate. Accordingly, illumination can be provided at the fire scene during the fire suppression, thus enhancing safety and convenience of the fire suppression.

On the other hand, when the illumination for the fire scene is sufficient or the fire scene requires more fluid pressure or amount for fire suppression, the operator can reversely rotate the revolver 150 with one hand, enabling the revolver 150 to move (downward) in the grip 130, and further driving the turbine generator 140 to move (downward) into the grip 130, as shown in FIG. 1A. At this point, the rotating blades 141 of the turbine generator 140 are not subjected to the impact of the fluid (water) flowing through the interior of the nozzle 110 any more and thus stop rotating. The turbine generator 140 stops generating the electric power. Accordingly, the fluid pressure in the nozzle 110 is not reduced by obstruction of the turbine generator 140, such that the amount of the fluid spouted from the fluid outlet (end 112) of the nozzle 110 is increased, thereby enhancing the efficiency of the fire suppression.

Moreover, when the turbine generator 140 moves (upward) into the nozzle 110, the resilient elements 170 connected between the turbine generator 140 and the inner wall of the grip 130 are stretched to provide elastic tension. When the revolver 150 moves (downward) in the grip 130, restoring resilience provided by the resilient elements 170 ensures that the turbine generator 140 moves (downward) with the revolver 150.

Second Embodiment

Figure 2A:
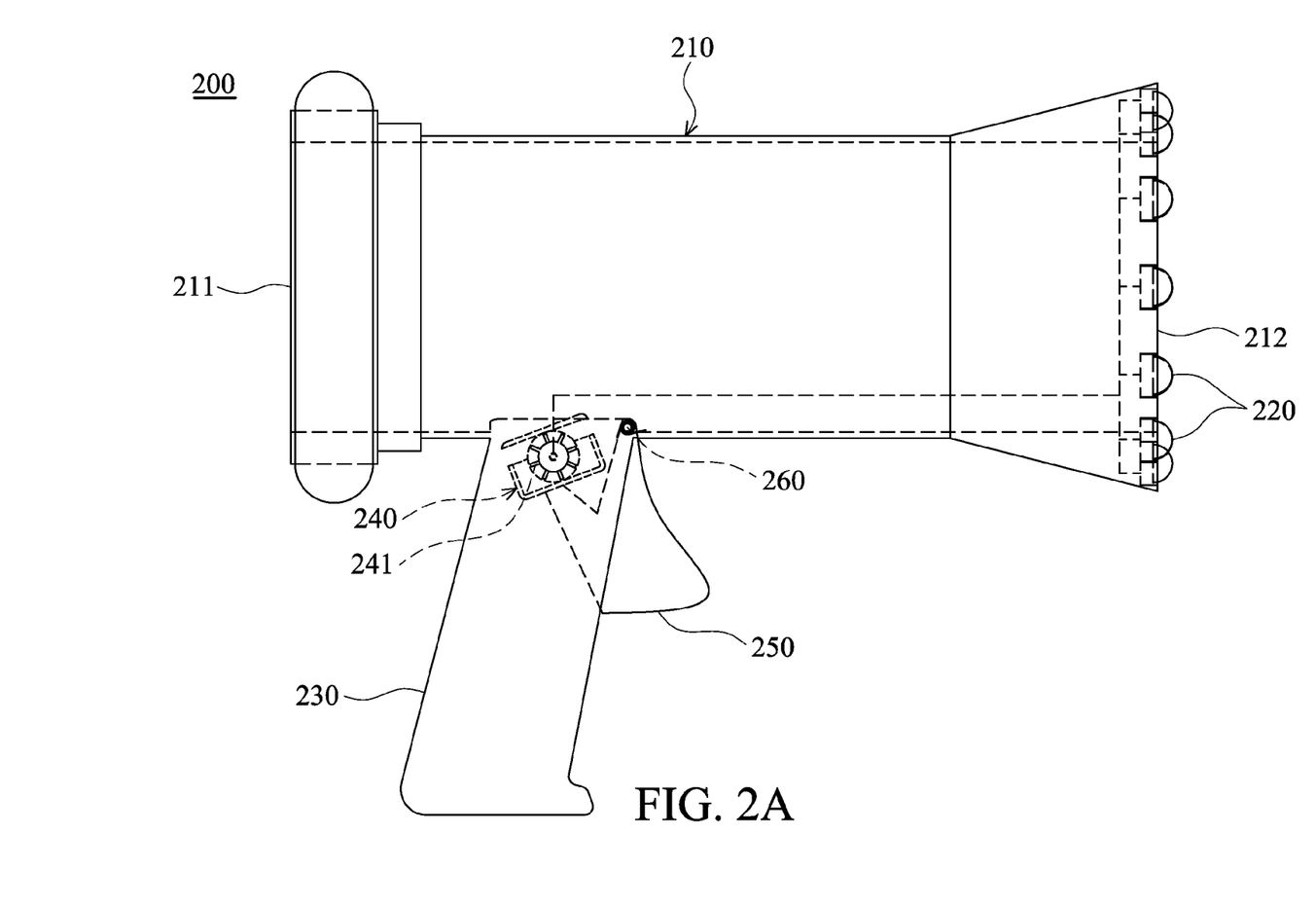
FIG. 2A is a schematic plane view of an adjustable fluid-driven illumination device of a second embodiment of the invention in an operational mode.
Figure 2B:
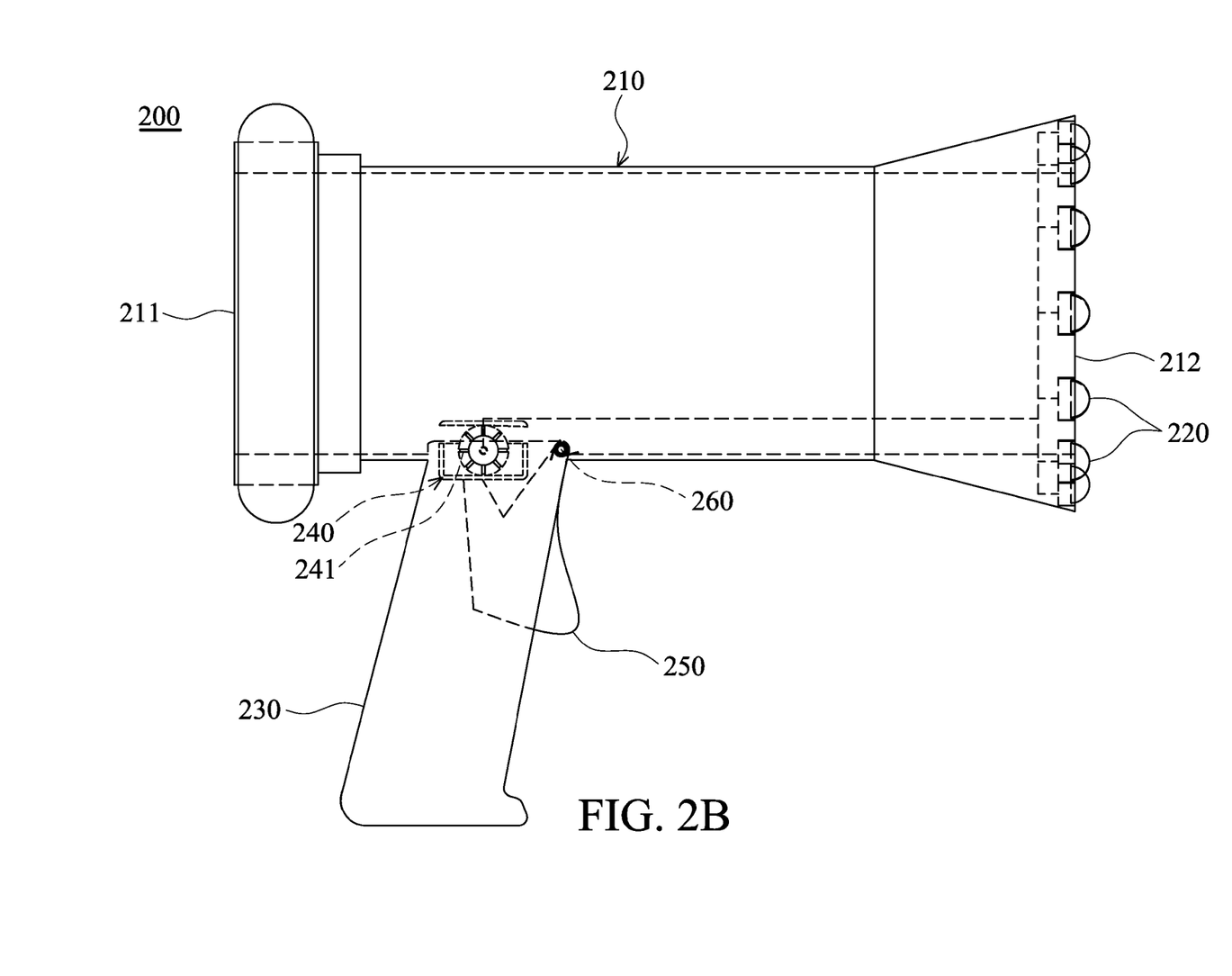
FIG. 2B is a schematic plane view of the adjustable fluid-driven illumination device of the second embodiment of the invention in another operational mode.

Referring to FIG. 2A and FIG. 2B, an adjustable fluid-driven illumination device 200 is applied for fire suppression and comprises a nozzle 210, a plurality of light-emitting elements 220, a grip 230, a turbine generator 240, a trigger 250, and a torsion spring 260.

One end 211 of the nozzle 210 may connect to a fluid supply piping (not shown). Similarly, the nozzle 210 may serve as a fire-fighting nozzle.

The light-emitting elements 220 are connected to the nozzle 210. Specifically, the light-emitting elements 220 may be disposed on the other end 212 of the nozzle 210. Moreover, the light-emitting elements 220 may be high-brightness LEDs or light bulbs.

The grip 230 is connected to the nozzle 210. In this embodiment, the grip 230 is disposed between the end 211 and end 212 of the nozzle 210.

The turbine generator 240 is electrically connected to the light-emitting elements 220 and comprises a plurality of rotating blades 241. Similarly, the rotating blades 241 may be radial blades, impulse blades, or axial blades.

The trigger 250 is rotatably connected to the grip 230 and is connected to the turbine generator 240. Accordingly, by turning the trigger 250, the turbine generator 240 can move between the nozzle 210 and the grip 230.

The torsion spring 260 is connected between the trigger 250 and the grip 230, providing restoring resilience to the trigger 250.

The following description is directed to operation of fire suppression using the adjustable fluid-driven illumination device 200.

An operator or a firefighter can hold the nozzle 210 and aim a fluid outlet (i.e. the end 112) thereof at a fire source or fire scene. A fluid, such as water, flowing through the nozzle 210 can then be spouted to the fire source or fire scene.

When the fire scene is dark and requires illumination, the operator can press or turn the trigger 250 with one hand, enabling the trigger 250 to rotate (clockwise) in the grip 230, and further driving the turbine generator 240 to move (upward) into the nozzle 210, as shown in FIG. 2B. At this point, the rotating blades 241 of the turbine generator 240 are rotated by impact of the fluid (water) flowing through the interior of the nozzle 210, driving the turbine generator 240 to generate electric power. The electric power generated by the turbine generator 240 is transmitted to the light-emitting elements 220 disposed on the fluid outlet (end 212) of the nozzle 210, driving the light-emitting elements 220 to irradiate. Accordingly, illumination can be provided at the fire scene during the fire suppression, thus enhancing safety and convenience of the fire suppression. Moreover, when the trigger 250 rotates to move the turbine generator 240 (upward) into the nozzle 210, the torsion spring 260 is compressed, providing restoring resilience.

On the other hand, when the illumination for the fire scene is sufficient or the fire scene requires more fluid pressure or amount for fire suppression, the operator can release the trigger 250, enabling the trigger 250 to rotate (counterclockwise) in the grip 230 by the restoring resilience provided by the torsion spring 260, and further driving the turbine generator 240 to move (downward) into the grip 230, as shown in FIG. 2A. At this point, the rotating blades 241 of the turbine generator 240 are not subjected to the impact of the fluid (water) flowing through the interior of the nozzle 210 any more and thus stop rotating. The turbine generator 240 stops generating the electric power. Accordingly, the fluid pressure in the nozzle 210 is not reduced by obstruction of the turbine generator 240, such that the amount of the fluid spouted from the fluid outlet (end 212) of the nozzle 210 is increased, thereby enhancing the efficiency of the fire suppression.

Moreover, in some circumstances, when the pressure of the fluid flowing through the interior of the nozzle 210 is strong enough to overcome the restoring resilience or elastic tension provided by the torsion spring 260, the turbine generator 240 can be positioned in the nozzle 210 without persistently pressing or turning the trigger 250, further enhancing the convenience of the fire suppression. When the pressure of the fluid flowing through the interior of the nozzle 210 is reduced or the fluid does not flow through the interior thereof any more, the turbine generator 240 can move (downward) into the grip 230 by the restoring resilience provided by the torsion spring 260.

Third Embodiment

Figure 3A:
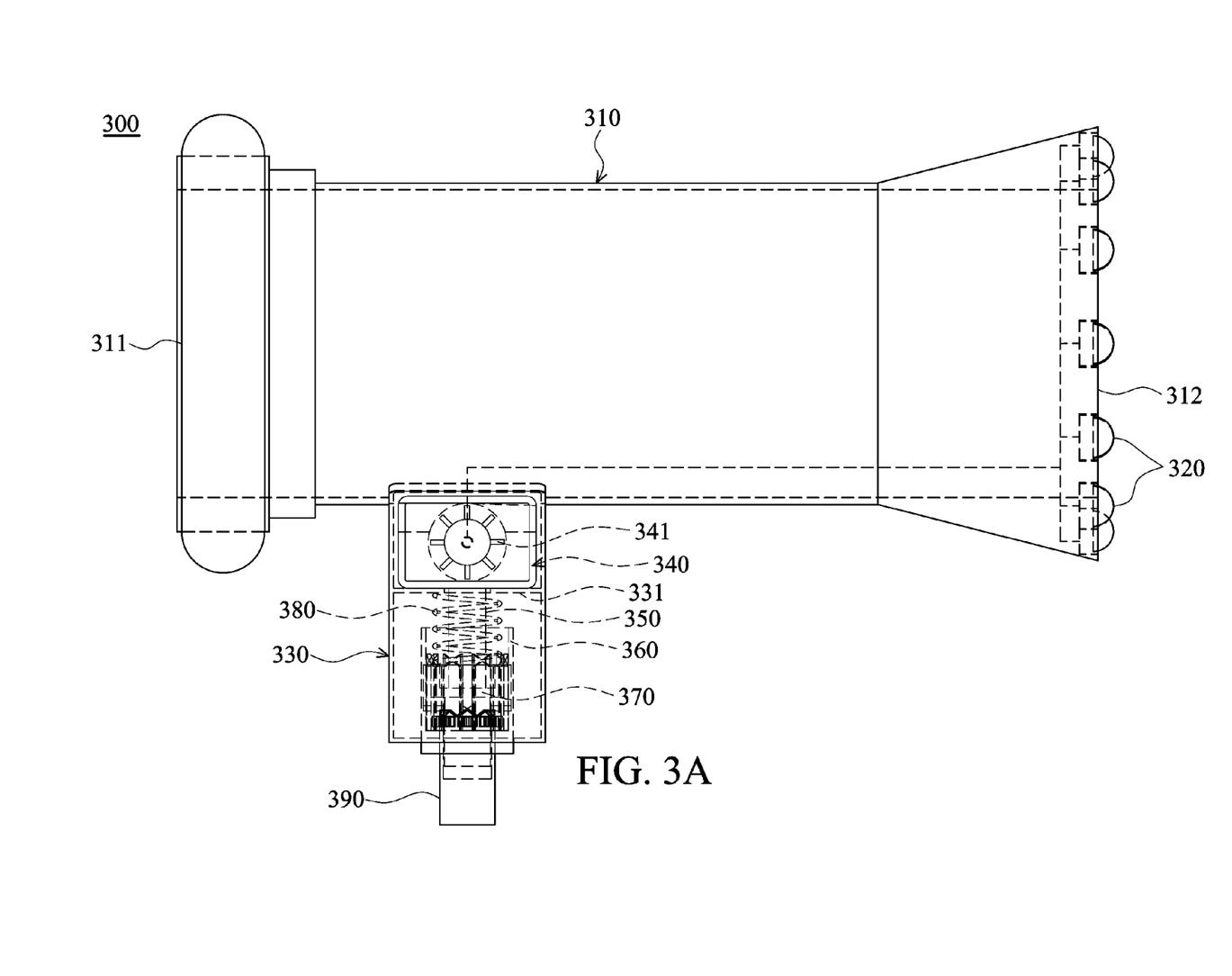
FIG. 3A is a schematic plane view of an adjustable fluid-driven illumination device of a third embodiment of the invention in an operational mode.
Figure 3B:
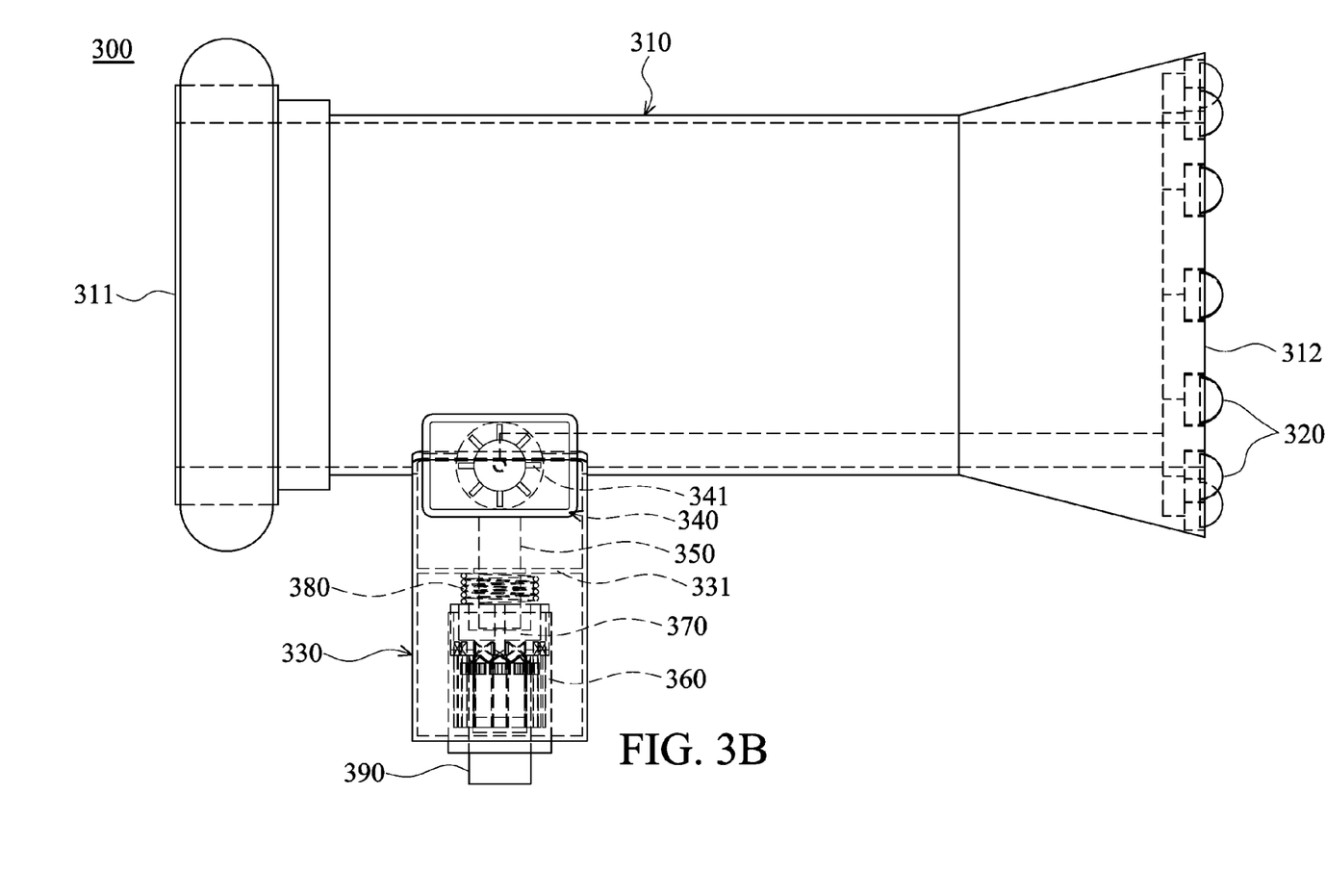
FIG. 3B is a schematic plane view of the adjustable fluid-driven illumination device of the third embodiment of the invention in another operational mode.
Figure 3C:
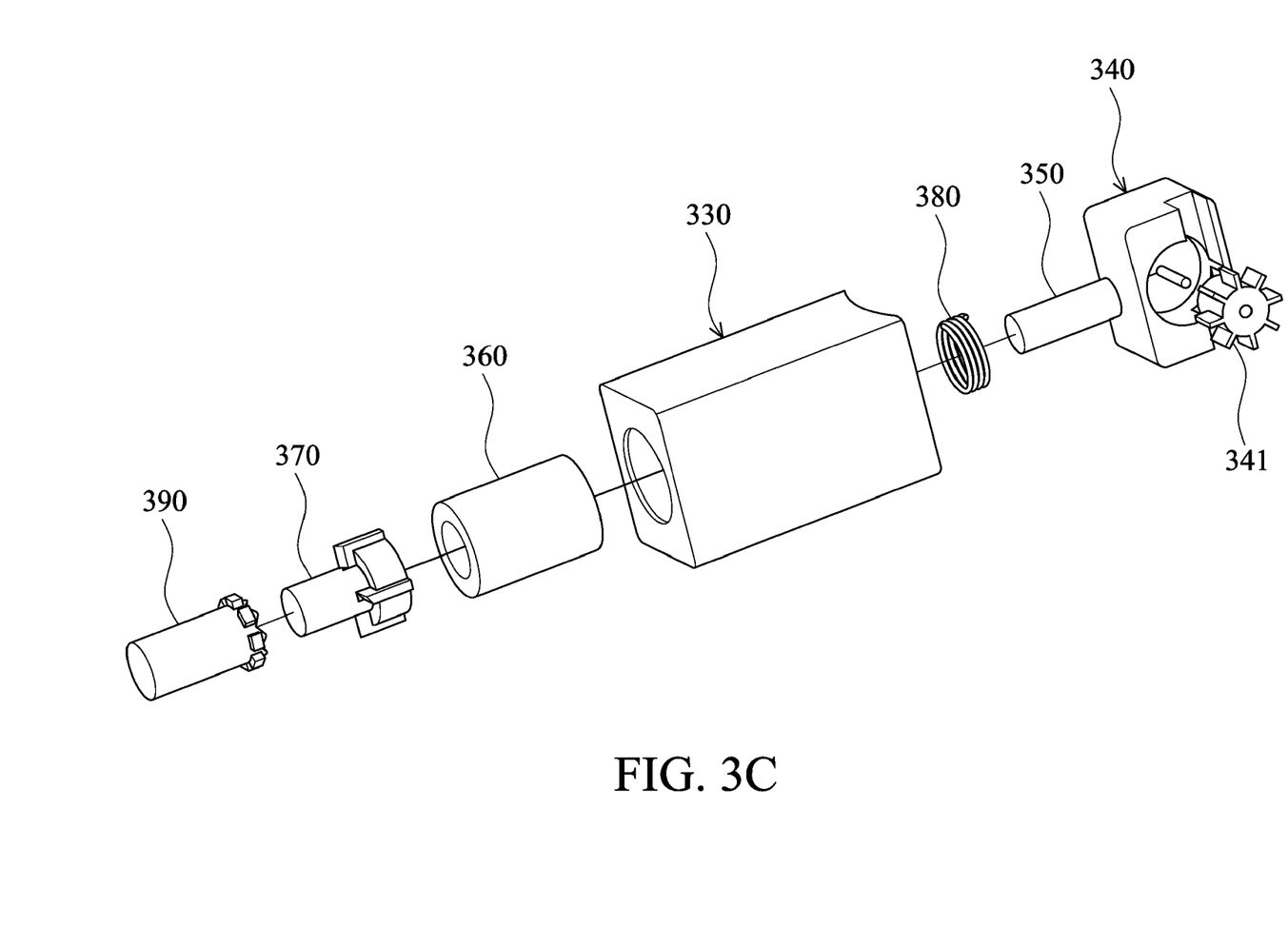
FIG. 3C is a partial exploded perspective view of the adjustable fluid-driven illumination device of the third embodiment of the invention.

Referring to FIGS. 3A, 3B, and 3C, an adjustable fluid-driven illumination device 300 is applied for fire suppression and comprises a nozzle 310, a plurality of light-emitting elements 320, a grip 330, a turbine generator 340, a support rod 350, a fixed tube 360, a self-rotation shaft 370, a spring 380, and a button 390.

One end 311 of the nozzle 310 may connect to a fluid supply piping (not shown). Similarly, the nozzle 310 may serve as a fire-fighting nozzle.

The light-emitting elements 320 are connected to the nozzle 310. Specifically, the light-emitting elements 320 may be disposed on the other end 312 of the nozzle 310. Similarly, the light-emitting elements 320 may be high-brightness LEDs or light bulbs.

The grip 330 is connected to the nozzle 310. In this embodiment, the grip 330 is disposed between the end 311 and end 312 of the nozzle 310. Additionally, as shown in FIG. 3A and FIG. 3B, the grip 330 comprises a partition 331.

The turbine generator 340 is electrically connected to the light-emitting elements 320 and comprises a plurality of rotating blades 341. In this embodiment, turbine generator 340 is disposed on the partition 331 of the grip 330. Similarly, the rotating blades 341 may be radial blades, impulse blades, or axial blades.

The support rod 350 is fit in the partition 331 of the grip 330 and is connected to the turbine generator 340.

The fixed tube 360 is disposed under the partition 331 of the grip 330.

The self-rotation shaft 370 is movably disposed in the fixed tube 360 and abuts the support rod 350.

The spring 380 is fit on the support rod 350 and is connected between the partition 331 of the grip 330 and the self-rotation shaft 370.

The button 390 is connected to the self-rotation shaft 370, driving the turbine generator 340 to move between the nozzle 310 and the grip 330.

The following description is directed to operation of fire suppression using the adjustable fluid-driven illumination device 300.

An operator or a firefighter can hold the nozzle 310 and aim a fluid outlet (i.e. the end 312) thereof at a fire source or fire scene. A fluid, such as water, flowing through the nozzle 310 can then be spouted to the fire source or fire scene.

When the fire scene is dark and requires illumination, the operator can press the button 390. Here, as shown in FIG. 3B, teeth on an end of the button 390 contact four teeth of the self-rotation shaft 370 and push the self-rotation shaft 370 upward. At the same time, the spring 380 is compressed and the support rod 350 and turbine generator 340 are pushed upward. When the button 390 is pressed to a top point, because of an inclined relationship between the teeth, the four teeth of the self-rotation shaft 370 leftward slide down and are obstructed by tooth sliding tracks disposed in the interior of the fixed tube 360. As the tooth sliding tracks are separated from each other and an obstruction plate is separated from a passage, related mechanisms are obstructed on the top when the button 390 is pressed once. Accordingly, by pressing the button 390, the turbine generator 340 can move (upward) into the nozzle 310. At this point, the rotating blades 341 of the turbine generator 340 are rotated by impact of the fluid (water) flowing through the interior of the nozzle 310, driving the turbine generator 340 to generate electric power. The electric power generated by the turbine generator 340 is transmitted to the light-emitting elements 320 disposed on the fluid outlet (end 312) of the nozzle 310, driving the light-emitting elements 320 to irradiate. Accordingly, illumination can be provided at the fire scene during the fire suppression, thus enhancing safety and convenience of the fire suppression.

On the other hand, when the illumination for the fire scene is sufficient or the fire scene requires more fluid pressure or amount for fire suppression, the operator can again press the button 390 with one hand. Here, the self-rotation shaft 370 slides down into the passage, enabling the turbine generator 340, support rod 350, self-rotation shaft 370, and button 390 to downward return to original positions thereof by restoring resilience provided by the spring 380. Accordingly, by pressing the button 390 again, the turbine generator 340 can move (downward) into the grip 330, as shown in FIG. 3A. At this point, the rotating blades 341 of the turbine generator 340 are not subjected to the impact of the fluid (water) flowing through the interior of the nozzle 310 any more and thus stop rotating. The turbine generator 340 stops generating the electric power. Accordingly, the fluid pressure in the nozzle 310 is not reduced by obstruction of the turbine generator 340, such that the amount of the fluid spouted from the fluid outlet (end 312) of the nozzle 310 is increased, thereby enhancing the efficiency of the fire suppression.

Fourth Embodiment

Figure 4A:
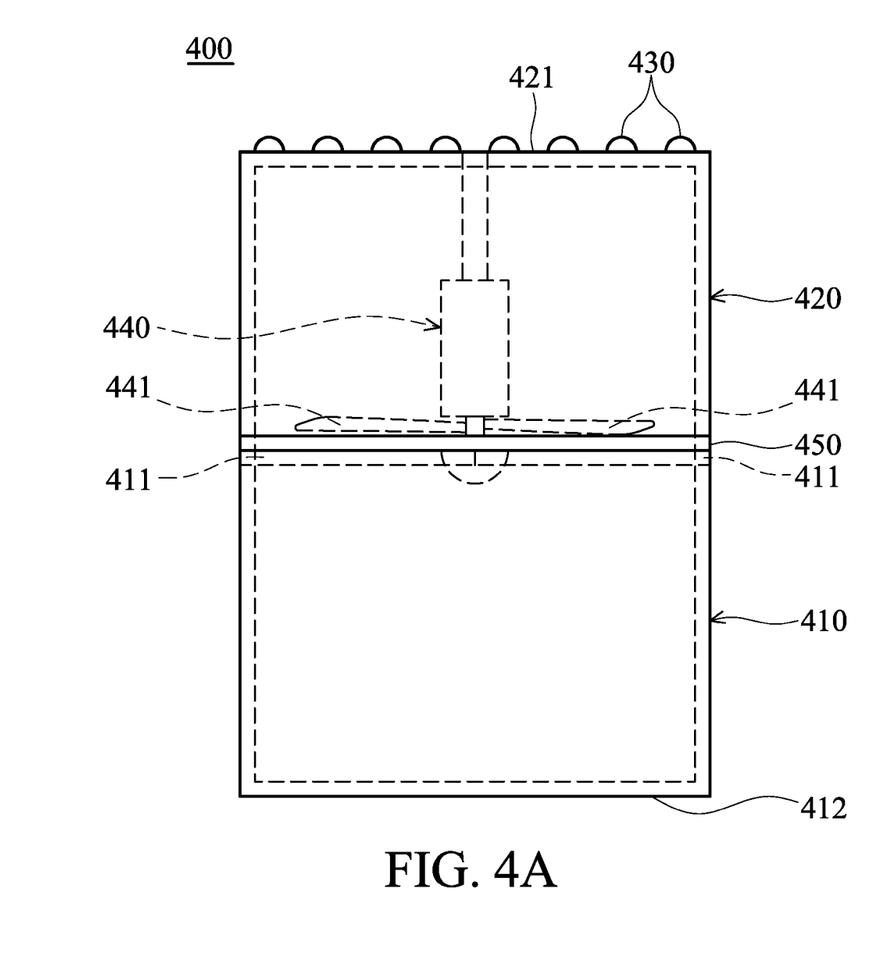
FIG. 4A is a schematic plane view of an adjustable fluid-driven illumination device of a fourth embodiment of the invention.
Figure 4B:
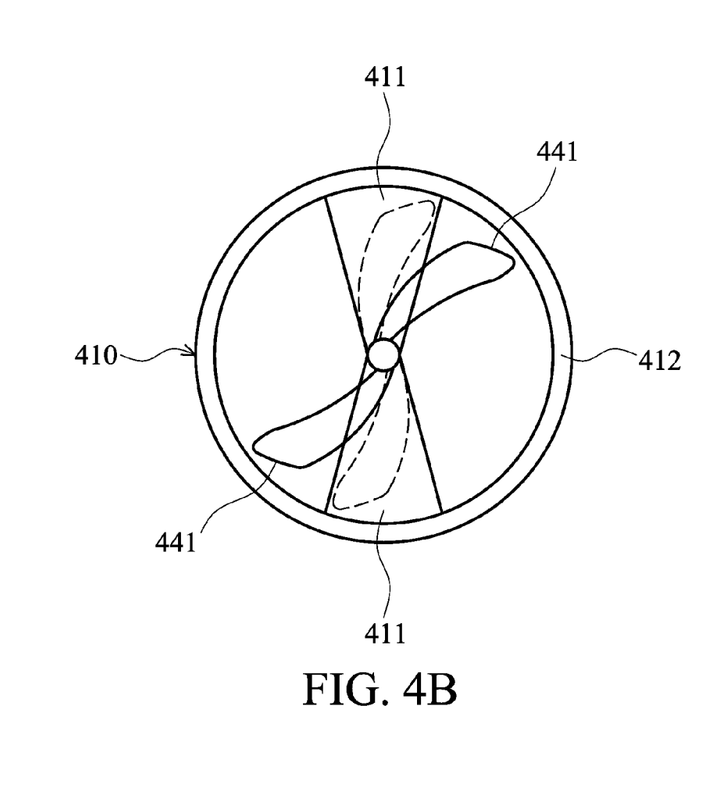
FIG. 4B is a schematic bottom view of FIG. 4A.

Referring to FIG. 4A and FIG. 4B, an adjustable fluid-driven illumination device 400 is applied for fire suppression and comprises a first tube 410, a second tube 420, a plurality of light-emitting elements 430, a turbine generator 440, and a sealing ring 450.

The first tube 410 comprises a plurality of retardant plates 411. In this embodiment, an end 412 of the first tube 410 may connect to a fluid supply piping (not shown).

The second tube 420 rotatably connects to the first tube 410. In this embodiment, a central axis of the first tube 410 in the flowing direction of a fluid is aligned with that of the second tube 420 in the flowing direction of the fluid. Moreover, the first tube 410 and second tube 420 may construct a sprinkler.

The light-emitting elements 430 are connected to the second tube 420. Specifically, the light-emitting elements 430 may be disposed on an end 421 of the second tube 420. Moreover, the light-emitting elements 430 may be high-brightness LEDs or light bulbs.

The turbine generator 440 is disposed in the second tube 420 and is electrically connected to the light-emitting elements 430. Moreover, the turbine generator 440 comprises a plurality of rotating blades 441 adjacent to and corresponding to the retardant plates 411 of the first tube 410. Additionally, the rotating blades 441 are selectively covered by the retardant plates 411. In this embodiment, the rotating blades 441 may be axial blades.

The sealing ring 450 is disposed between the first tube 410 and the second tube 420, providing functions of sealing therebetween.

The following description is directed to operation of fire suppression using the adjustable fluid-driven illumination device 400.

An operator or a firefighter can hold the first tube 410 or second tube 420 and aim a fluid outlet (i.e. the end 421) of the second tube 420 at a fire source or fire scene. A fluid, such as water, flowing through the first tube 410 and second tube 420 can then be spouted to the fire source or fire scene.

When the fire scene is dark and requires illumination, the operator can relatively rotate the first tube 410 and second tube 420 to expose the rotating blades 441 of the turbine generator 440 from the retardant plates 411 of the first tube 410, as shown by the rotating blades 441 depicted by solid lines in FIG. 4B. At this point, the rotating blades 441 of the turbine generator 440 is rotated by impact of the fluid flowing through the interior of the first tube 410 and second tube 420, enabling the turbine generator 440 to generate electric power. The electric power generated by the turbine generator 440 is transmitted to the light-emitting elements 430 disposed on the fluid outlet (end 421) of the second tube 420, driving the light-emitting elements 430 to irradiate. Accordingly, illumination can be provided at the fire scene during the fire suppression, thus enhancing safety and convenience of the fire suppression.

On the other hand, when the illumination for the fire scene is sufficient or the fire scene requires more fluid pressure or amount for fire suppression, the operator can relatively rotate the first tube 410 and second tube 420 before the fluid flows through the first tube 410 and second tube 420 or after the fluid has not been supplied thereinto, enabling the rotating blades 441 of the turbine generator 440 to be covered or obstructed by the retardant plates 411 of the first tube 410, as shown by the rotating blades 441 depicted by dotted lines in FIG. 4B. At this point, the rotating blades 441 of the turbine generator 440 are not subjected to the impact of the fluid (water) flowing through the interior of the first tube 410 and second tube 420 any more and thus remain stationary behind the retardant plates 411. The turbine generator 440 stops generating the electric power. Accordingly, the fluid pressure in the first tube 410 and second tube 420 is not reduced by obstruction of the rotating blades 441, such that the amount of the fluid spouted from the fluid outlet (end 421) of the second tube 420 is increased, thereby enhancing the efficiency of the fire suppression.

Figure 4C:
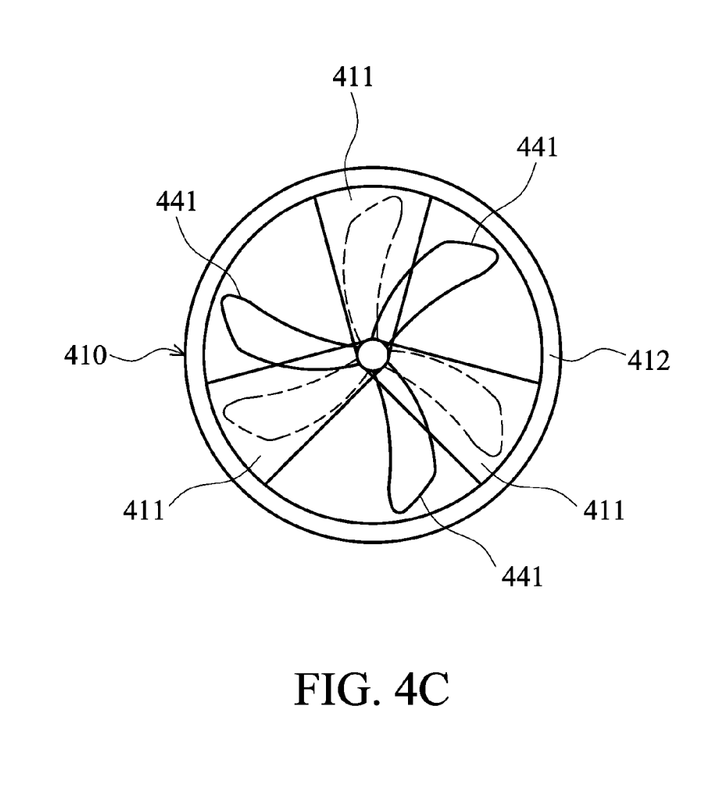
FIG. 4C is another schematic bottom view of FIG. 4A.

Moreover, the turbine generator 440 is not limited to having two rotating blades 441 and the first tube 410 is not limited to having two retardant plates 411. Specifically, according to practical application requirements, the turbine generator 440 may have more rotating blades 441 and the first tube 410 may have more corresponding retardant plates 411. For example, as shown in FIG. 4C, the turbine generator 440 comprises three rotating blades 441 and the first tube 410 comprises three corresponding retardant plates 411.

In conclusion, in the disclosed adjustable fluid-driven illumination devices, the turbine generators can be moved into or out of fluid passages of the nozzles or selectively impacted by the fluid flowing through the fluid passages as required. When illumination is required for the fire scene and the fluid pressure is sufficient, the turbine generators can be easily moved into the fluid passages of the nozzles by transfer mechanisms and impacted by the fluid flowing therethrough. The turbine generators can then generate the electric power, driving the light-emitting elements electrically connected thereto to illuminate the fire scene, and further assisting in fire suppression and fire rescuing. On the contrary, when a fire occurs in a bright outdoor place (i.e. the operator does not need assisted illumination), the turbine generators can be easily removed from the fluid passages of the nozzles by the transfer mechanisms and are not impacted by the fluid flowing therethrough. The adjustable fluid-driven illumination devices can then provide original fluid-spouting functions and the fluid pressure is not reduced. Accordingly, the operator can adjustably obtain proper illumination and a fluid source during the unpredictable fire scene using the disclosed adjustable fluid-driven illumination devices, assuring personal and colleague safety and enhancing fire-suppression efficiency. Furthermore, the illumination provided by the disclosed adjustable fluid-driven illumination devices may assists victims in escaping fires.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adjustable fluid-driven illumination device, comprising:
   a nozzle;
   at least one light-emitting element connected to the nozzle;
   a grip connected to the nozzle; and
   a turbine generator electrically connected to the light-emitting element, and including at least one rotatable blade; and
   an actuator moving the turbine generator between a first position inside the grip and a second position at least partially into the nozzle;
   wherein the first and second positions are arranged such that when the turbine generator is in the second position, the at least one rotatable blade is caused to rotate by the impact of a fluid flowing through the nozzle, the turbine generator thereby generating electric power, to power the light-emitting element and when the turbine generator is in the second position, the rotatable blade is not subjected to the impact of the fluid flowing through the nozzle, stopping the turbine generator from generating the electric power.

2. The adjustable fluid-driven illumination device as claimed in claim 1, the actuator further comprising at least one resilient element connected between the turbine generator and the grip, providing restoring resilience to the turbine generator.

3. The adjustable fluid-driven illumination device as claimed in claim 1, the actuator further comprising a support rod, a fixed tube, a self-rotation shaft, a spring, and a button, wherein the grip comprises a partition on which the turbine generator is disposed, the support rod is fit in the partition and is connected to the turbine generator, the fixed tube is disposed under the partition, the self-rotation shaft is movably disposed in the fixed tube and abuts the support rod, the spring is fit on the support rod and is connected between the partition and the self-rotation shaft, and the button is connected to the self-rotation shaft, driving the turbine generator to move between the nozzle and the grip.

4. The adjustable fluid-driven illumination device as claimed in claim 1, wherein the rotatable blade comprises a radial blade, an impulse blade, or an axial blade.

5. The adjustable fluid-driven illumination device as claimed in claim 1, the actuator further comprising a trigger rotatably connected to the grip and connected to the turbine generator, driving the turbine generator to move between the nozzle and the grip.

6. The adjustable fluid-driven illumination device as claimed in claim 5, further comprising a torsion spring connected between the trigger and the grip, providing restoring resilience to the trigger.

7. The adjustable fluid-driven illumination device as claimed in claim 1, the actuator comprising a revolver rotatably and movably connected to the grip and abutting the turbine generator, driving the turbine generator to move between the nozzle and the grip.

8. The adjustable fluid-driven illumination device as claimed in claim 7, wherein the grip comprises an inner threaded portion, and the revolver comprises an outer threaded portion engaging the inner threaded portion.

9. The adjustable fluid-driven illumination device as claimed in claim 7, the actuator further comprising a push rod abutting the revolver and connected to the turbine generator.

10. An adjustable fluid-driven illumination device, comprising:
a first tube comprising at least one retardant plate;
a second tube rotatably connecting to the first tube;
at least one light-emitting element connected to the second tube; and
a turbine generator disposed in the second tube and electrically connected to the light-emitting element, wherein the turbine generator comprises at least one rotatable blade adjacent to and selectively covered by the retardant plate, arranged such that when the first and second tubes rotate with respect to each other to expose the rotatable blade from the retardant plate, the rotatable blade is rotated by impact of a fluid flowing through the first and second tubes, enabling the turbine generator to generate electric power to power the light-emitting element, and when the fluid flow is interrupted and the first and second tubes rotate with respect to each other to cover the rotatable blade with the retardant plate, the rotating rotatable blade is not subjected to the impact of the fluid flowing through the first and second tubes when the fluid flow is resumed, stopping the turbine generator from generating the electric power.

11. The adjustable fluid-driven illumination device as claimed in claim 10, further comprising a sealing ring disposed between the first and second tubes.

12. The adjustable fluid-driven illumination device as claimed in claim 10, wherein a central axis of the first tube in the flowing direction of the fluid is aligned with that of the second tube in the flowing direction of the fluid.

13. The adjustable fluid-driven illumination device as claimed in claim 10, wherein the rotatable blade comprises an axial blade.

* * * * *